J. L. KLEINMAN.
SAW BLADE.
APPLICATION FILED OCT. 2, 1917.
1,368,441. Patented Feb. 15, 1921.
Fig. 1.
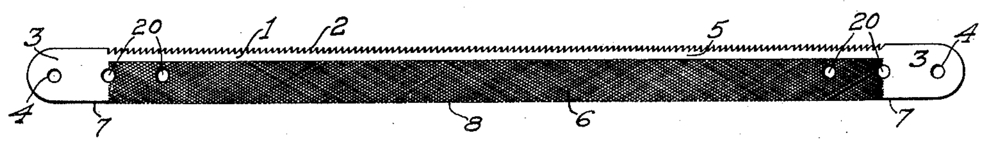
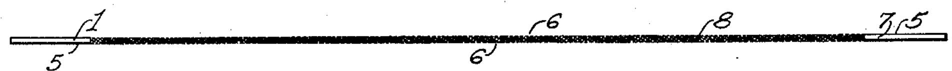
Fig. 2.
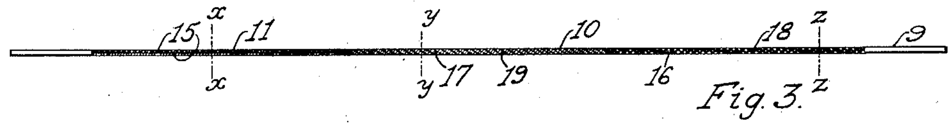
Fig. 3.
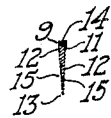
Fig. 4
Fig. 5.
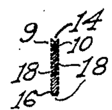
Fig. 6.
INVENTOR
Jacob L. Kleinman
BY
Benjamin Roman.
ATTORNEY

UNITED STATES PATENT OFFICE.

JACOB L. KLEINMAN, OF NEW YORK, N. Y.

SAW-BLADE.

1,368,441. Specification of Letters Patent. Patented Feb. 15, 1921.

Application filed October 2, 1917. Serial No. 194,333.

*To all whom it may concern:*

Be it known that I, JACOB L. KLEINMAN, a citizen of the United States, and resident of the city of New York, in the county of New York and State of New York, have invented a certain new and useful Saw-Blade, of which the following is a specification.

This invention relates to saws, and particulary to hack saw blades that may be utilized for that class of metal work that requires filing or smoothing of the sawed edges or surfaces of the metal. Such work necessitates filing in conjunction with the sawing, or alternate sawing and filing operations, in order to smooth out the sawed surfaces as the work proceeds, and the worker is therefore compelled to alternately take hold and manipulate a saw and a file for carrying on the work, which alternation of change of operation causes inconvenience and loss of time.

The principal object of my invention is to prevent the aforesaid inconveniences and loss of time, and to provide a simple, inexpensive, and improved hack saw blade with which the worker will be enabled to file and smooth the sawed edges and surfaces, and which will therefore enable filing of the sawed surfaces in conjunction with the sawing operation and with a single implement. With this saw blade, the sawing and filing operations may be performed simultaneously, rapidly, and conveniently, and the separate and alternate use of a saw and of a file as distinct implements obviated.

Other objects and advantages will hereinafter appear.

In the accompanying drawings,—

Figure 1 shows a general elevation of the saw blade.

Fig. 2 is an edgewise view of the saw blade shown in Fig. 1.

Fig. 3 is an edgewise view of a saw blade showing a modification of the invention.

Figs. 4, 5, and 6 are cross-sectional elevations, taken respectively on the lines $x—x$, $y—y$, and $z—z$ in Fig. 3.

The saw blade 1 is of the type utilized for sawing metal which is thin and flexible and is provided with a toothed sawing-edge 2, rounded ends 3, and holes 4 in said ends to permit engagement thereof in an operating implement or hand-frame, not shown, in connection with which these saw blades are ordinarily utilized and termed hack-saws. Each of the sides 5 of the saw-blade 1 has formed thereupon a suitable filing surface 6, and the edge 7 of the saw-blade opposite its toothed sawing-edge 2 is likewise provided with a filing surface 8.

According to the modification shown in Fig. 3, the saw blade 9 has portions 10, 11 thereof made of different configurations, the former of which is rectangular in cross-section, as shown in Figs. 5 and 6, and the latter of which is triangular in cross-section, as disclosed in Fig. 4, and has its tapering sides 12 converging toward its edge 13 opposite its toothed sawing-edge 14. The sides 12 have formed thereupon suitable filing surfaces 15, while the saw-blade portion 10 is provided with different portions 16 and 17 that have formed thereupon different kinds of filing surfaces 18 and 19 respectively that are adapted for varying filing operations, the former surface being rougher and the latter filing surface finer than the filing surface 15 of the saw-blade portion 11.

When utilizing the saw blade, the metal operated upon may be sawed in the ordinary manner, and then the sawed surfaces of the metal may be filed and smoothed over with the filing surfaces 6, 8, 18, 19, or 15 of the saw blades, according to convenience and the nature of the work. From the foregoing description it will be evident to any mechanic conversant with metal-work requiring simultaneous sawing and filing operations that this saw can be utilized very conveniently, rapidly, and effectively for performing filing operations in conjunction with the sawing operations, such as employing the edges of the intersecting filing surfaces 6, 8, 18, 19, and 15 for marking the work, and for filing and smoothing out sawed notches, smoothing sawed surfaces, etc., of metal bars, sheets, and castings. It will be also evident that the different configurations 10, 11 of saw blade 9 and its different filing surfaces 15, 19, 18 will permit performing a variety of filing operations and conduce to convenience, rapidity, and general excellence of the work. As the filing surface 6 is preferably higher than the smooth surface 5 the filing operation ordinarily proceeds at the same time as the sawing operation or while the saw-blade sinks into the cut, so that upon the completion of the sawing the sawed surface is already filed out and smoothed and no additional filing operation is required, thereby saving the time that is otherwise taken up in performing the filing operation separately with a distinct tool.

Additional holes 20, similar to the holes 4, are provided at the ends of the saw blade to permit attachment of the blade to the operating hand-frame upon accidental breaking of the blade at the hole 4, which breaking frequently occurs while the blade is mounted in the frame and during the sawing operation.

Variations may be resorted to without departing from the spirit and scope of the invention, as now claimed.

Having thus described my invention, I claim:—

1. A flexible saw blade having the combination of a toothed edge for the sawing operation, and the side of the blade having a filing surface adapted to be utilized for filing operations in conjunction with the sawing operation.

2. A flexible saw blade having the combination of a toothed edge for the sawing operation, and each of the opposite sides of the blade having a filing surface adapted to be utilized for filing operations in conjunction with the sawing operation.

3. A flexible saw blade having the combination of a toothed edge for the sawing operation, and the edge of said blade opposite said toothed edge having a plurality of different filing surfaces adapted to be utilized for varying filing operations.

4. A flexible saw blade having the combination of a toothed edge for the sawing operation, and the edge of the blade opposite said toothed edge having a filing surface.

Signed at the city of New York, in the county of New York, and State of New York, this 22nd day of September, A. D. 1917.

JACOB L. KLEINMAN.

Witnesses:
R. T. ROMAN,
B. ROMAN.